Figure 1:
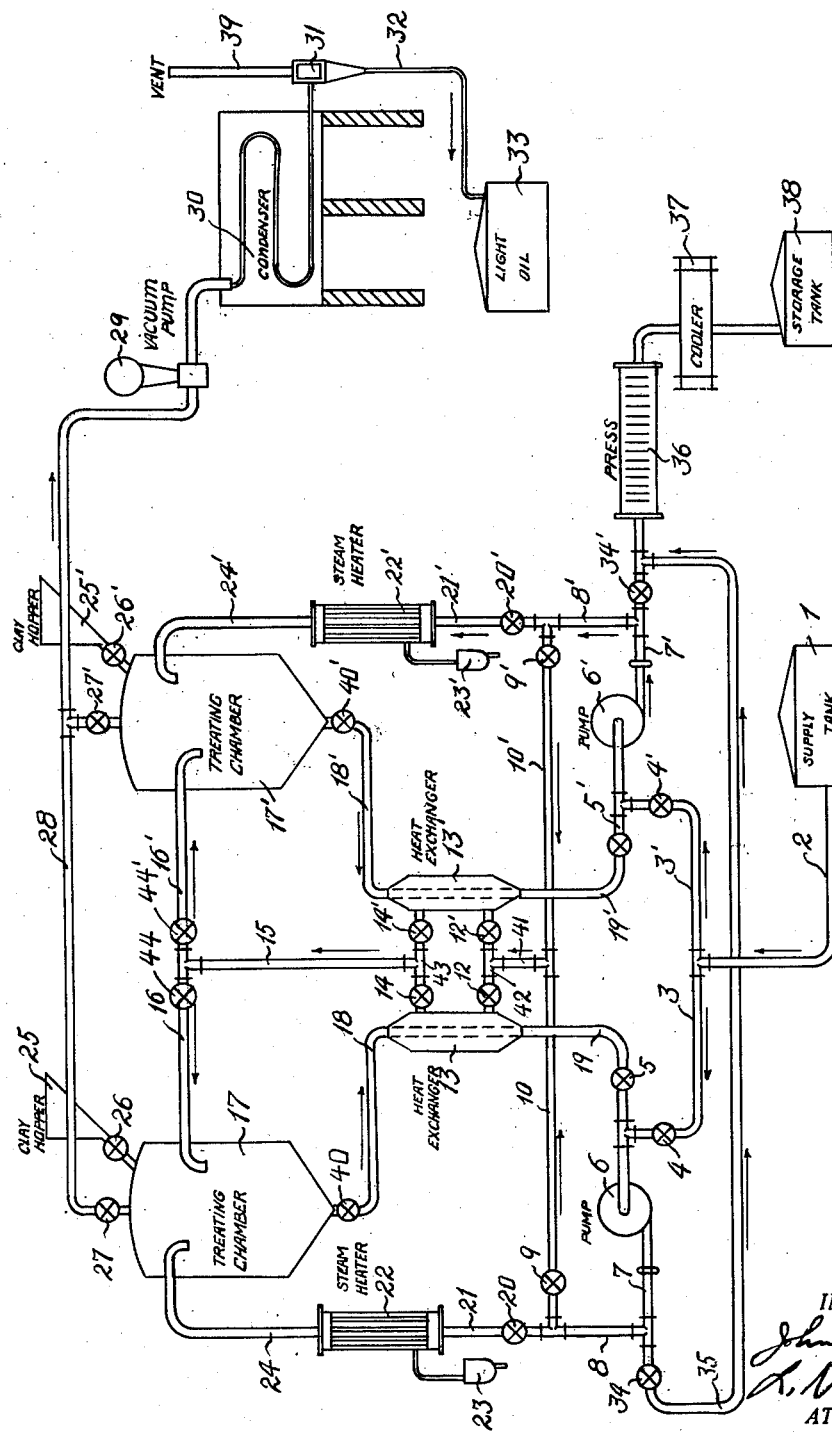

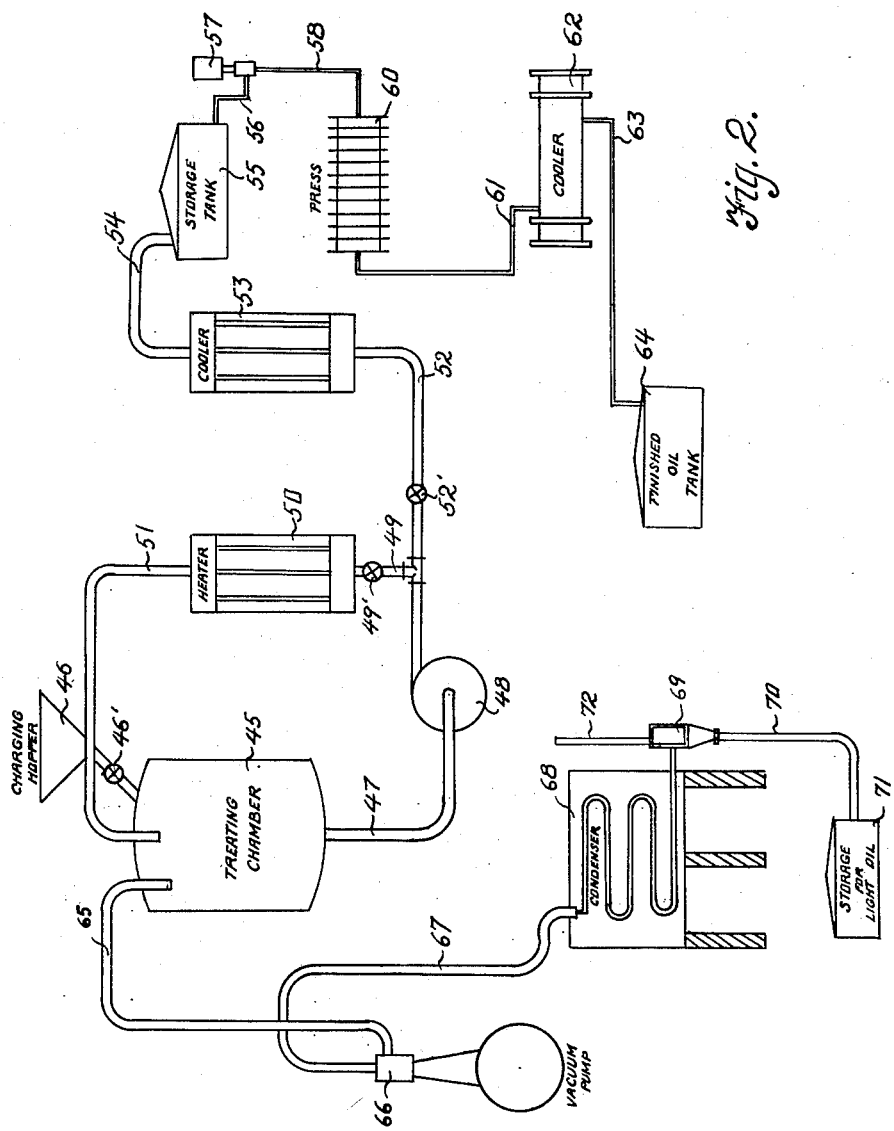

Patented Nov. 24, 1931

1,832,892

UNITED STATES PATENT OFFICE

JOHN C. BLACK, OF DESTREHAN, LOUISIANA, ASSIGNOR, BY MESNE ASSIGNMENTS, TO CONTACT FILTRATION COMPANY, OF SAN FRANCISCO, CALIFORNIA, A CORPORATION OF DELAWARE

PROCESS FOR REFINING OILS

Application filed October 26, 1926. Serial No. 144,346.

This application refers to a process and apparatus for treating oil especially to a process for refining oil. Application No. 371,399 filed April 5, 1920, of which this application is a continuation in part, discloses a process for refining oils in which oil is heated with an adsorbent clay to improve the color and brightness of the oil. The invention of this application pertains broadly to the same process and has for its specific purpose an improvement in the method of operation and an improvement in the apparatus employed. The process comprises broadly heating oil and adsorbent material for instance adsorbent clay or other adsorbent bodies under conditions involving the exclusion of air.

In operating at elevated temperature it has been found that unless special precautions be taken to exclude air the oil tends to oxidize and this tendency increases with increased temperature. This oxidation is also accelerated by the presence of the adsorbent material.

I have found it particularly useful to operate at as high a temperature as possible. The higher the temperature the more rapid and more complete the reaction. It is an object of this invention therefore to devise a process for treating oil with adsorbent material at an elevated temperature without exposing the oil to a material oxidation.

Another object of this invention is to devise a process for treating oil with adsorbent material and to continue the treatment for a prolonged period of time without material oxidation.

I have found that although the process is more rapid and complete at higher temperature, analogous results may be obtained at lower temperature by extending the period of time during which the treatment is carried out. However, the same precautions must be taken to prevent oxidation which is itself a function of the time, increasing if the period of time during which the oil is exposed is increased.

I have found that if the oil be treated as described in my co-pending application, and during the treatment is subjected to a vacuum, the troublesome oxidation effects are diminished and practically completely inhibited.

It is therefore another object of my invention to devise a process for the treatment of oil under vacuum and particularly for the refining of oil with adsorbent material under vacuum.

Another object of my invention is to devise a process for the refining of oil with adsorbent material which would be practically continuous, and in which the sensible heat of the treated oil is recovered in the process.

Another object of my invention is to improve the quality and flash point. A process to be more fully described hereinafter is directed particularly to the improvement in the quality of oils, particularly to the improvement of color of oils.

The process is more specifically directed to the improvement of mineral oils and in the preferred embodiment directed to the treatment of heavy petroleum distillates such as lubricating oils. The process may be applied to vegetable oils such as edible vegetable oils, or to other vegetable oils whose decolorization is desired. The decolorizing or purifying adsorbent material employed may be adsorbent charcoal, adsorbent clays, silica gel, fuller's earth either acid treated or raw, bentonite, Death Valley clay, adsorbent magnesium silicate whether acid treated or raw.

The invention will be better understood by reference to the accompanying drawings. Fig. 1 shows a complete plan for the operation of this invention in the continuous manner. Fig. 2 shows a more simple discontinuous batch system process.

In Fig. 1, 1 is a supply tank containing the material to be treated. 2 is a transfer line connecting with branch lines 3 and 3'. In the latter lines are valves 4 and 4'. Lines 3 and 3' connect with lines 19 and 19' in which are valves 5 and 5'. 6 and 6' are pumps in lines 19 and 19' respectively. The exits of the pumps are connected to lines 7 and 7' respectively. 8 and 8' are pipe lines connecting lines 7 and 7' with lines 21 and 21', in which lines are valves 20 and 20' respectively, which connect lines 8 and 8' to heaters 22 and 22' respectively. 17 and 17' are treating chambers. Lines 24 and 24' connect the heaters 22 and 22' to the treating chambers 17 and 17'. To the bottom of treating chambers 17 and 17' are connected exit pipes 18 and 18' in which are valves 40 and 40'. Pipes 18 and 18' connect with pipes 19 and 19' via heat exchangers 13 and 13'. Pipes 10 and 10' connect pipes 8 and 8' to heat exchangers 13 and 13'. In pipe 10 is a valve 9 and in pipe 10' is a valve 9'. 42 is a cross-over connecting exchanger 13 to exchanger 13'. In this cross-over are valves 12 and 12'. Cross-over 42 is connected to pipes 10 and 10' by means of cross-over pipe 41. Heat exchangers 13 and 13' are also connected by pipe 43. In this pipe are valves 14 and 14'. Pipe 43 is connected at a point between said valves with pipe 15. Pipe 15 is connected to pipes 16 and 16', which lead to treating chambers 17 and 17' respectively. In line 16 is a valve 44 and in line 16' is a valve 44'. Treating chamber 17 and treating chamber 17' are connected to line 28 by a conduit controlled by valves 27 and 27' respectively. Line 28 is connected to vacuum pump 29, which is in turn connected to condenser 30. Condenser 30 is connected to a lookbox 31 which is in turn connected to a condensate run down line to a connecting tank 33. A gas vent 39 is connected to a lookbox 31. While the illustration shows the condenser situated after the vacuum pump it will be obvious to the man skilled in the art that the condenser or an additional condenser will be inserted at a point intermediate the treating chamber and the vacuum pump. Connected to line 8 and controlled by a valve 34 is a line 35. In line 7' is another valve 34' situated at a point between the connecting point of line 35 and line 7'. Connected to line 7' is a filter press 36 which connects with a cooler 37 and a storage tank 38. Hoppers 25 and 25' for feeding adsorbent material are connected to chambers 17 and 17'. These hoppers are controlled by valves 26 and 26'.

Fig. 2 shows a modification of the apparatus shown in Fig. 1. 45 is a treating chamber to which is connected a charging hopper 46 controlled by valve 46'. To the bottom of this treating chamber is connected a line 47 in which there is a pump 48. This pump connects via line 49, controlled by valve 49', to a heater 50, which in turn connects via line 51 to the treating chamber 45. Pump 48 is also connected via line 52, controlled by a valve 52', to a cooler 53, which cooler is connected by means of a line 54 to a storage tank 55. This storage tank is connected by line 56 to a pump 57, which is in turn connected by a line 58 to a filter press 60. The filter press is connected by line 61 to a cooler 62. This cooler is connected by line 63 to a storage tank 64. The chamber 45 is connected by line 65 to a vacuum pump 66. The exit line of the vacuum pump is connected by a line 67 to a condenser 68. This condenser is connected to a lookbox 69 which is in turn connected to a condenser run down line 70 and to a storage tank 71. The lookbox has a gas vent 72. As described in connection with the previous figure, the condenser may be placed at a point between the treating chamber and a vacuum pump or an additional condenser may be inserted at that point.

The operation of the process is as follows:

Considering first the operation in connection with the apparatus shown in Fig. 2, the oil to be treated is fed into the chamber 45 by means of pump and line not shown. The adsorbent material is then introduced via the hopper 46. The mixture is then circulated by means of the pump 48, valve 52' being closed and valve 49 opened, through the heater 50 and through line 51 back into the treating chamber. This cyclic circulation is maintained throughout the process. The vacuum pump is started to draw a vacuum on the treating chamber. The temperature and the vacuum are gradually raised, care being taken to avoid bubbling over and frothing. This is particularly aggravated if the oil contains any light fractions or if the oil contains water, or if the clay charge contains adsorbed water. If this be the case the oil should be maintained at a relatively low temperature or at relatively smaller vacuum until the light material has boiled out. When this light material has been boiled out the temperature or vacuum may be increased and the temperature raised to the desired point at which the oil is circulated for a predetermined length of time. After the treatment has been completed, valve 49' is closed and 52' opened and the material pumped through the cooler 53 into the storage tank 55. From the storage tank 55 the material is pumped via line 58 through the filter press 60. Care should be taken in limiting the cooling of the oil in cooler 53 so that the oil may still be fluid during the filter pressing operation. The clarified oil is then cooled in cooler 62 and stored in finished oil tank 64. The light material which has been drawn off line 65 is condensed in condenser 68 and collected in light oil storage tank 71.

As a specific example the following might be given as illustrating one of the many types of operations to which this process is adapted. 100 barrels of oil may be treated in one chamber. The oil is gradually raised up to 180 or 200° Fahrenheit in about 15 or 20 minutes, the vacuum being increased up to about 10 inches. At this point the temperature is then raised to about 250 to 400° F.

and the vacuum increased to the desired point. This may be allowed 25 to 26 inches, but may be as high a vacuum as possible to obtain, for instance, down to a millimeter or more of absolute vacuum. This increase in temperature may be carried on over any desired length of time, but as a matter of practical operation I desire this to be as rapid as possible. When the maximum temperature and vacuum has been reached I circulate for about 15 minutes. At this maximum temperature the air must be exhausted and with the operation described above this would be the case. When the treatment is completed I bypass the oil to the cooler and through the storage and filter press as above described. The maximum temperature which I prefer to employ should be below that at which the oil undergoes any material decomposition, since this would affect the character of the oil by lowering its viscosity and flash point. However, the use of vacuum permits the employment of these very high temperatures since it will remove the light products formed by the decomposition and thus re-establish the viscosity and flash point of the original oil.

The operation in accordance with the modification shown in Fig. 1 is analogous to that shown in Fig. 2 but involves certain refinements in operation. Assuming that the treatment in chamber 17' is complete and that oil is to be discharged from 17' to the filter press, and assuming that oil is to be sent to chamber 17 for treatment, the following operations are performed. Valve 40' being opened, oil is circulated by pump 6' through the heat exchanger 13', through 19', valve 5' being opened and valve 4' being closed, through lines 7' and 8', valve 34' being closed, 9' being closed and 20' being opened, through 21' and 24' back to the chamber 17'. During this circulation the steam is cut off the heater 22'. Oil is picked up by pump 6 from tank 1 through lines 2 and 3, valve 4 being open and valve 5 being closed, and circulated through line 7 to line 8, valves 20 and 34 being closed and valve 9 being opened, through line 10, line 41, valve 12 being closed, through valve 12', exchanger 13', line 43, valve 14' being open and 14 closed, through line 15 to line 16, valve 44' being closed and valve 44 open, to chamber 17. When chamber 17 is filled valve 4 is closed and clay is introduced via the hopper 25. However, clay may be introduced during the period in which oil is being pumped into the chamber 17 or at a later period, depending on the temperature of the oil. The pump continues circulating oil by opening valves 40 and 5. Oil is then drawn through line 18, through heat exchanger 13, line 19, through pump 6, line 7, line 10, and as before through exchanger 13, line 15, line 16, back to the chamber 17. When the oil in chamber 17 has been heated to the desired point, or when the oil in chamber 17' has been cooled to the desired point, the passage of the oil in chambers 17 and 17' in heat exchange relationship is interrupted. The circulation of oil in chamber 17 is then switched by closing valve 9 and 44 and opening valve 20. The oil is then circulated from chamber 17 through line 18, line 19, through the pump 6, line 7, 8, 21 and 24 back to the chamber 17. At the same time oil from the chamber 17' is circulated to the press 36 by closing valve 20' and opening valve 34'. The oil is then passed through the filter press, through the cooler and through the tank 38. The operation here is the same as in the previous case, the temperature and pressures being manipulated in an analogous manner. In both cases the clay hoppers may be provided with valves such as rotary valves for feeding the adsorbent material without admitting air to the feeding chambers. The operation when the treatment in 17 is completed and the charging of 17' will be obvious from the above and the drawing to those skilled in the art. The apparatus is symmetrical.

The above is not to be taken as limiting my invention but merely illustrative of the best manner of operating my invention, which I claim to be:

1. A method of refining oils, comprising subjecting a mixture of liquid oil and a solid adsorbent material in a reaction zone to sub-atmospheric pressure and a temperature below 250° F., to remove air and moisture contained in said mixture, discharging water vapors from said reaction zone during such treatment, then increasing the vacuum on said zone and increasing the temperature of said mixture to above 250° F., while maintaining such mixture in a liquid state, said temperature and vacuum being insufficient to vaporize a substantial portion of the oil, discharging from said zone and separately condensing any vaporized portions of the oil, and finally discharging the treated oil and adsorbent from said zone and separating the oil from the adsorbent.

2. A method of refining oils, comprising subjecting a mixture of liquid oil and a solid adsorbent material in a reaction zone to sub-atmospheric pressure and a temperature below that at which substantial reaction occurs between the oil and adsorbent to remove substantially all the air and moisture contained in said liquid mixture, discharging water vapors from said reaction zone during such treatment, then increasing the vacuum on said zone and increasing the temperature of said mixture while in a liquid state, to cause said adsorbent to affect the oil, said temperature and vacuum being insufficient to vaporize a substantial portion of the oil, removing from said zone and condensing any vaporized portion of the oil, and finally discharging the treated liquid oil and adsorbent from said zone and separating the oil from the adsorbent.

3. A method of refining oils, comprising subjecting a mixture of liquid oil and a solid adsorbent material in a reaction zone to a sub-atmospheric pressure and a temperature below that at which substantial reaction occurs between the oil and adsorbent, so as to remove air and moisture contained in said liquid mixture, circulating the mixture into and out of said zone during such treatment, discharging evolved water vapors from said reaction zone during such treatment, then increasing the vacuum on said zone and increasing the temperature of said liquid mixture to a reaction temperature, to cause said adsorbent to affect the oil, said temperature and vacuum being insufficient to vaporize a substantial portion of the oil, removing from said zone and condensing any portion of the oil vaporized during such further treatment, and finally discharging the treated liquid oil and adsorbent from said zone, and separating the oil from the adsorbent.

In testimony whereof I affix my signature.

JOHN C. BLACK.